Sept. 21, 1965   J. VON STRATEN FINNE   3,207,520
FERTILIZER DISTRIBUTOR
Filed April 6, 1964

INVENTOR
Jacob von Straten Finne
BY *Stevens, Davis, Miller & Mosher*
ATTORNEYS 3,207,520
FERTILIZER DISTRIBUTOR
Jacob von Straten Finne, Sandgatan 14B,
Norrkoping, Sweden
Filed Apr. 6, 1964, Ser. No. 357,412
Claims priority, application Sweden, Apr. 9, 1963,
3,899/63
5 Claims. (Cl. 275—2)

The present invention relates to a fertilizer distributor which makes it possible, as desired, to adjust the quantity of fertilizer spread and either to spread it evenly over the whole machine width or in rows and, in the latter case, to adjust the distance between the rows.

The fertilizer distributor, according to the invention, is provided with an endless belt situated below a container, which belt is arranged to move in a direction perpendicular to the direction of travel of the distributor and with a number of stationary members spaced along this belt and adapted to feed out the fertilizer.

The invention will be further described in connection with an embodiment shown on the enclosed drawing on which:

Figure 1:
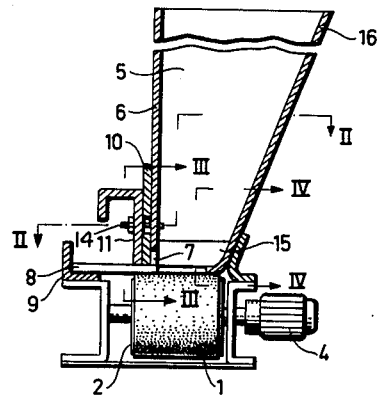
FIG. 1 is a vertical cross-section of the fertilizer distributor.
Figure 2:
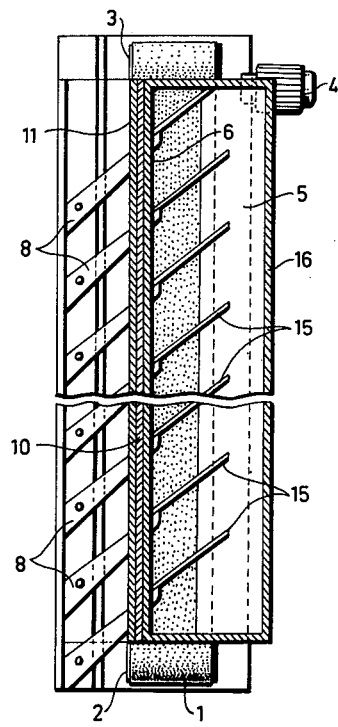
FIG. 2 is a section taken along line II—II in FIG. 1.
Figure 3:
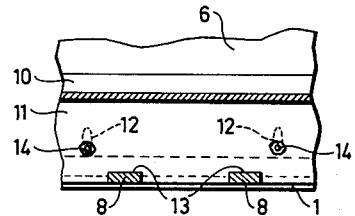
FIG. 3 is a fragmentary section taken along line III—III in FIG. 1.
Figure 4:
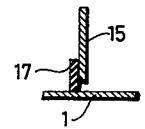
FIG. 4 is a fragmentary section taken along line IV—IV in FIG. 1.

In the drawings 1 designates an endless belt arranged to move perpendicular to the direction of travel of the distributor and guided by means of two wheels 2, 3 at each end of the distributor and one of which is driven by a power arrangement, for example a variable speed rotary hydraulic motor 4.

The belt 1 forms the bottom of a container 5 for the fertilizer. One wall 6 of the container 5 situated above one edge of the belt 1 is generally vertical and between its lower edge and the belt 1 there is a slot-like clearance 7 of substantially constant height.

On a beam 9 extending along and outside of clearance 7 there are provided a number of fingers 8, suitably of rectangular cross-section, and preferably at an angle of 35° relative the longitudinal axis of the beam, said fingers being so arranged that they slightly project through the clearance 7.

A vertically movable feed adjustment slide 10 is arranged to rest in its lower position with its straight lower edge on the fingers 8 directly outside of the wall 6. Another vertically movable feed adjustment slide 11 is provided immediately outside of said first feed adjustment slide 10 and provided along its lower edge with notches 13 for the fingers 8, in order to be able to rest on the upper side of the belt 1 and thereby completely close off the feeding of the fertilizer.

The feed adjustment slide 10 is provided with a least two vertical slots 12 into which pegs 14 on the feed adjustment slide 11 project. The pegs 14 have on their outer ends any suitable means, such as a nut or other locking device, for engaging and clamping the slides 10 and 11 to wall 6. The slots 12 are of such a length and the pegs 14 are so arranged that the feed adjustment slide 11, when lifted to a height where its lower edge is level with the upper side of the fingers 8 carries with it the feed adjustment slide 10 in its upward movement.

Inside the container 5 between the front wall 6 and the back wall 16 there are a number of flat bars 15 standing on edge and preferably at an angle of 45° to the direction of travel of the belt 1.

The lower edge of the bars 15 terminate a short distance above the belt 1 and can preferably be provided with a projection in the form of a rubber strip 17 or a brush that reaches to the upper side of the belt 1. The flat bars 15 are so arranged that when the belt 1 is moving, the fertilizer in the container 5 is pushed towards the clearance 7.

When the distributor is being used for spreading in rows, the fingers 8 provided between the rows are taken away, or the whole beam 9 with the attached fingers 8 is exchanged for another beam 9 on which the fingers 8 are placed at the desired row spacing. It would however also be possible to place the fingers 8 on the flat bars 15 inside the front wall 6 and have them projecting through the clearance. In this case the flat bars 15 could even be connected to each other, and be taken out of the container as a unit and replaced by other bars having different finger spacing.

The feed quantity can be adjusted either by the feed adjustment slides 10, 11 or by varying the speed of the belt 1.

The above mentioned embodiment is only one of several that can be obtained within the scope of the invention.

I claim:

1. A distributor for sowing fertilizer in rows as well as for broadcasting, comprising a generally rectangular container for holding the fertilizer to be distributed, a longitudinally moving endless belt forming a bottom for said container, means to drive said belt, one longitudinal wall of said container being spaced above said belt forming a slot therebetween, a plurality of stationary, parallel, diagonally mounted scraper members disposed along the bottom of said container extending through said slot, said scraper members comprising bar portions within said container and finger portions projecting from said container through said slot, said bar portions having a substantial vertical dimension and being spaced above said belt, flexible members attached to and depending from said bar portion with one longitudinal edge contacting said belt, said bar portions impeding the movement of fertilizer along said belt and directing it towards said slot, said finger portions continuing to guide said ferterlizer outwardly from said slot whereby it will be deposited in rows.

2. A distributor according to claim wherein said finger portions and said bar portions are integral.

3. A distributor according to claim 1 wherein a beam is mounted outwardly of said container adjacent to but spaced from said slot, said fingers being adjustably mounted beam whereby they can be adjusted in parallel to alter the row spacing.

4. A distributor according to claim 1 wherein means are provided for adjusting the opening of said slot, said means comprising an outer feed adjustment slide and an inner feed adjustment slide, both said slides being movably mounted on the longitudinal wall of said container above said slot with said inner slide being positioned between said outer slide and said wall, notches corresponding to the positioning of said finger portions being provided in the lower edge of said outer slide, said inner slide having a straight lower edge resting on top of said fingers, said slides being so connected that said outer slide must be raised until its bottom edge is level with the upper edge of the finger portions before said inner slide will raise, beyond this point said outer slide carrying with it said inner slide.

5. A distributor according to claim 1 wherein said means to drive said belt may be speed adjusted.

References Cited by the Examiner

UNITED STATES PATENTS

| 339,454 | 4/86 | McWhorter | 275—14 X |
| 1,632,199 | 6/27 | Schnath | 222—415 X |

FOREIGN PATENTS 93,209  7/62  Denmark.

ABRAHAM G. STONE, *Primary Examiner.*

WILLIAM A. SMITH III, *Examiner.*